(12) United States Patent
Matsumoto et al.

(10) Patent No.: US 7,570,269 B2
(45) Date of Patent: Aug. 4, 2009

(54) FONT MANAGEMENT SYSTEM (75) Inventors: Tadaaki Matsumoto, Kanagawa (JP); Hideki Uematsu, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 318 days.

(21) Appl. No.: 11/422,161

(22) Filed: Jun. 5, 2006

(65) Prior Publication Data
US 2007/0075882 A1    Apr. 5, 2007

(30) Foreign Application Priority Data
Sep. 30, 2005    (JP)    ............... 2005-287708

(51) Int. Cl.
*G09G 5/22*    (2006.01)
*G06F 12/02*    (2006.01)

(52) U.S. Cl. ..................... 345/551; 345/565

(58) Field of Classification Search ........... 345/551, 345/565
See application file for complete search history.

(56) References Cited
U.S. PATENT DOCUMENTS
6,477,616 B1 * 11/2002 Takahashi ............... 711/111

2005/0270290 A1 * 12/2005 Liu et al. ............... 345/467

FOREIGN PATENT DOCUMENTS
JP    3240673    12/2001

* cited by examiner

*Primary Examiner*—Kee M Tung
*Assistant Examiner*—Jacinta Crawford
(74) *Attorney, Agent, or Firm*—Pamela R. Crocker (57) ABSTRACT

A time for displaying bitmap data is shortened, and the volume of a font table is reduced. A table having all records from start 0000h to end FFFFh is used as a pointer table which imparts a start address of bitmap data. A start address of bitmap data is stored in each of the records. Thereby, the character code directly accesses a corresponding record, to thus acquire a start address. Further, the volume of a font table is diminished by means of combined use, as pointer tables, of a first pointer table from which unused character code areas are removed and a second pointer table which specifies an address positional relationship between the respective character code areas achieved before removal and the respective character codes achieved after removal.

3 Claims, 8 Drawing Sheets

| CHARACTER CODE | STARTING ADDRESS |
|---|---|
| 0000h | 0 |
| 0001h | 0 |
| 0002h | 0 |
| :(omitted) | :(omitted) |
| 002Eh | 0 |
| 002Fh | 0 |
| 0031h | 02E30000h |
| 0032h | 02E30020h |
| 0033h | 02E30040h |
| 0034h | 0 |
| 0035h | 0 |
| :(omitted) | :(omitted) |
| 3001h | 02E30060h |
| 3002h | 02E30090h |
| 3003h | 0 |
| :(omitted) | :(omitted) |
| FFFFh | 0 |

| CHARACTER CODE | BITMAP ADDRESS |
|---|---|
| 0031h | 02E30000h |
| 0032h | 02E30020h |
| 0033h | 02E30040h |
| 3001h | 02E30060h |
| 3002h | 02E30090h |
| : | : |

Fig. 10

| BLANK SIZE | NUMBER OF BLANK AREAS | TOTAL SIZE |
|---|---|---|
| 1 | 1,500 | 6,000 |
| 2 | 800 | 6,400 |
| 5 | 500 | 10,000 |
| 12 | 10 | 480 |
| 13 | 12 | 624 |
| 14 | 3 | 168 |
| 15 | 8 | 480 |
| 20 | 7 | 560 |
| 150 | 2 | 1,200 |
| 172 | 3 | 2,064 |
| 231 | 1 | 924 |
| 1,285 | 2 | 10,280 |
| 1,501 | 3 | 18,012 |
| 1,823 | 2 | 14,584 |
| 2,446 | 1 | 9,784 |
| 3,267 | 1 | 13,068 |

Fig. 7

| | POINTER TABLE 12 | POINTER TABLE 14 | TOTAL |
|---|---|---|---|
| NO SKIPS | 65,536(records) × 4 = 262,144 bytes | 6(bytes) × 1 = 6 bytes | 262,150 bytes |
| SKIP 3267 BLANKS OR MORE | 262,144 - 13,068 = 249,076 bytes | 6(bytes) × 2 = 12 bytes | 249,088 bytes |
| SKIP 2446 BLANKS OR MORE | 249,076 - 9,784 = 239,292 bytes | 6(bytes) × 3 = 18 bytes | 239,310 bytes |
| SKIP 1823 BLANKS OR MORE | 239,292 - 14,584 = 224,708 bytes | 6(bytes) × 5 = 30 bytes | 224,738 bytes |
| SKIP 1501 BLANKS OR MORE | 224,708 - 18,012 = 206,696 bytes | 6(bytes) × 8 = 48 bytes | 206,744 bytes |
| SKIP 1285 BLANKS OR MORE | 206,696 - 10,280 = 196,416 bytes | 6(bytes) × 10 = 60 bytes | 196,416 bytes |

FONT MANAGEMENT SYSTEM

FIELD OF THE INVENTION

The present invention relates to a font management system, and more particularly, to a technique for reading from memory fonts corresponding to input character codes.

BACKGROUND OF THE INVENTION

As the functions of portable equipment, such as a cellular phone or a digital camera, become more sophisticated and the market for the portable equipment expands, a necessity for displaying a wide variety of characters on a display device of the portable equipment becomes greater. Character codes are assigned to respective characters, and the character codes include various types of codes, such as JIS kanji codes, Unicodes, and so forth. There are many cases where Unicodes—two-byte codes being allocated to all characters in order to address a plurality of languages—are used.

When characters are displayed on the display device, it is better to prepare beforehand a table, where start addresses and character codes of bitmap data are brought into a one-to-one correspondence; to take an input character code as a key and retrieve a start address corresponding to that character code from this table; and to read bitmap data from the start address, which has been acquired through the retrieval; and display the thus-read bitmap data.

Figure 10:
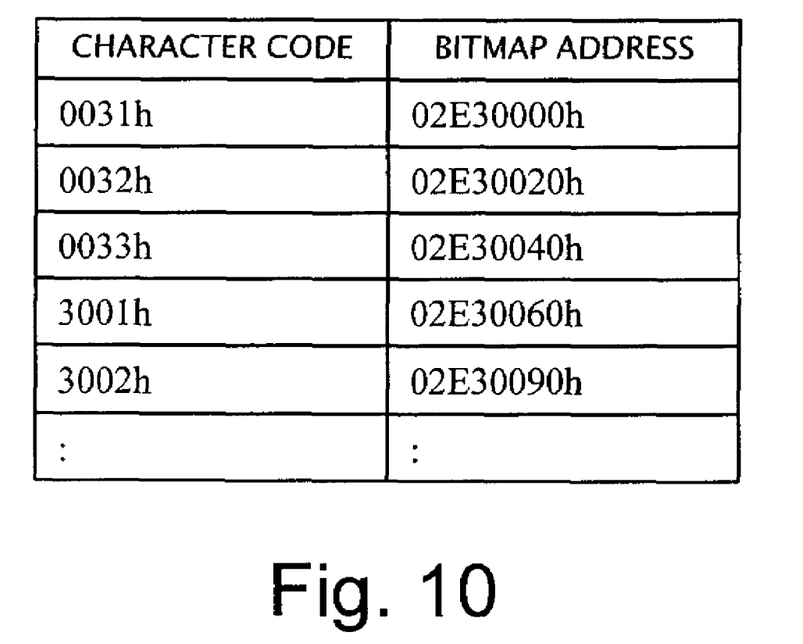
FIG. 10 is a descriptive view showing the configuration of a conventional pointer table.

FIG. 10 shows an example conventional search table. Character codes are represented in hexadecimal, and a character code and a start address of bitmap data corresponding thereto are stored, in one-to-one correspondence, in each record of the table. When a character code is input from a higher-level device, a processor performs sequential retrieval of a start address corresponding to the character code from the top of the table.

Japanese Patent 3,240,673 describes dividing a search table according to a code system of a character code.

However, a configuration for making a retrieval while taking a character code as a key, such as that shown in FIG. 10, has a problem of a necessity for sequential retrieval from the top of the table in order to obtain a start address of the input character code as well as a problem of consuming much time before the finally-input character is displayed on the display device. As a matter of course, when the range of supported character codes is narrow, such a system does not pose any problem. However, in the case of character codes which support a plurality of languages, the range of the character codes becomes enormous, and hence retrieval speed drops drastically. In a case where large amounts of characters are displayed simultaneously on the screen of a digital camera, or the like, a retrieval time required to render one character must be reduced to a minimum, and such a drop in retrieval speed is not desirable. Moreover, in consideration of an application of portable equipment, the memory capacity used for storing a table must be minimized, to thus effectively utilize system resources.

SUMMARY OF THE INVENTION

Accordingly, the present invention provides a system which enables shortening of a time to retrieve a font and cost reduction by means of effectively utilizing a system resource.

The present invention provides a font management system comprising:

an initial pointer table for storing start addresses of bitmap data assigned to all character codes included in a given coded character set; and a processor which, upon receipt of an input of a character code to be displayed, acquires a start address of bitmap data assigned to the input character code by reference to the initial pointer table and displays a character on a display device, wherein the initial pointer table has records allocated to all the character codes from start to end, and each of the records has a fixed length and stores a start address of bitmap data of the corresponding character code; and the processor directly accesses a corresponding record of the pointer table by means of the input character code, to thus acquire the start address.

The present invention also provides a font management system comprising:

a pointer table for storing start addresses of bitmap data assigned to all character codes included in a given coded character set; and a processor which, upon receipt of an input of a character code to be displayed, acquires a start address of bitmap data assigned to the input character code by reference to the pointer table and displays a character on a display device, wherein the pointer table includes a first pointer table and a second pointer table;

the first pointer table is formed by means of deleting at least some of character code areas, where bitmap data are not present, from an initial pointer table having records of fixed length where are stored start addresses of bitmap data assigned to all the character codes from start to end;

the second pointer table stores a relationship between positions of undeleted, remaining character code areas in the first pointer table and positions of the same in the initial pointer table; and the processor accesses the second pointer table to thus acquire an address of the input character code in the first pointer table, and directly accesses the corresponding record in the first pointer table by use of the acquired address to thereby acquire the start address.

According to the present invention, in the initial pointer table having records which store start addresses of bitmap data assigned to all character codes included in a predetermined coded character set, a given character code, which is a numeral, is subjected to simple computation processing, so that direct access can be made to a record which stores a start address of bitmap data of the character code. Therefore, the start address of desired bitmap data can be acquired in an extremely short period of time without involvement of a process which is indispensable in the related art; namely, retrieval from a table while a character code is taken as a key and which consumed much time.

Further, the first pointer table obtained by means of deleting, from the initial pointer table, character code areas where no bitmap data are present and the second pointer table which stores a positional relationship between addresses are used in combination as the pointer tables, so that the overall volume of the pointer tables is diminished and so that system resources can be effectively utilized.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

First Embodiment

Figure 1:
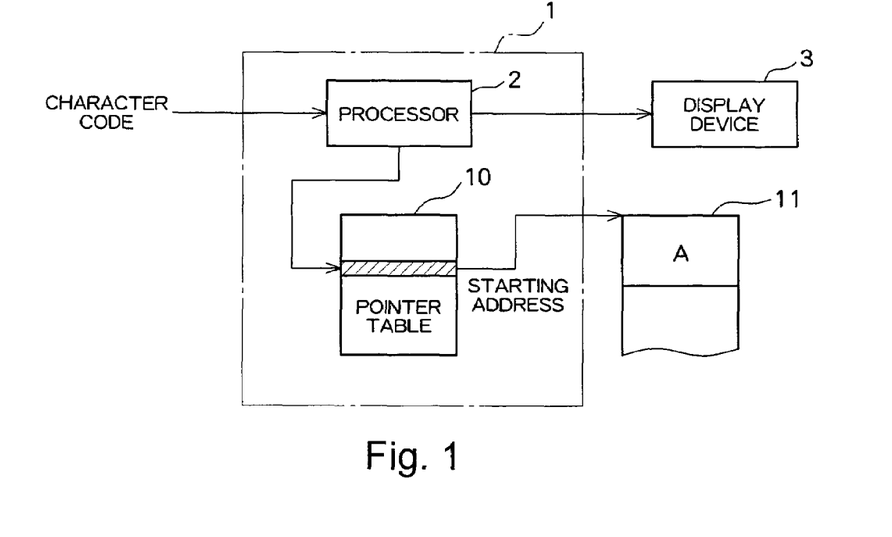
FIG. 1 is a block diagram showing the configuration of a font management system according to a first embodiment of the present invention.

FIG. 1 shows a block diagram pertaining to the configuration of a font management system 1 according to the first embodiment. The font management system is incorporated into a portable information terminal, such as a digital camera or the like. The font management system 1 includes a processor 2 into which character codes are input from a higher-level device; and a pointer table 10 which is accessed by the processor 2 and stores start addresses in bitmap data 11, which correspond to character codes. The table 10 is stored in ROM of the digital camera, or the like. The processor 2 acquires a start address corresponding to the input character code by means of accessing the table 10, and reads bitmap data from this start address to thus display the thus-read bitmap data on a display device 3. The display device 3 is an LCD screen, or the like, of the digital camera. The table 10 is for imparting the start address of the bitmap data and acts as the pointer table 10.

Figure 2:
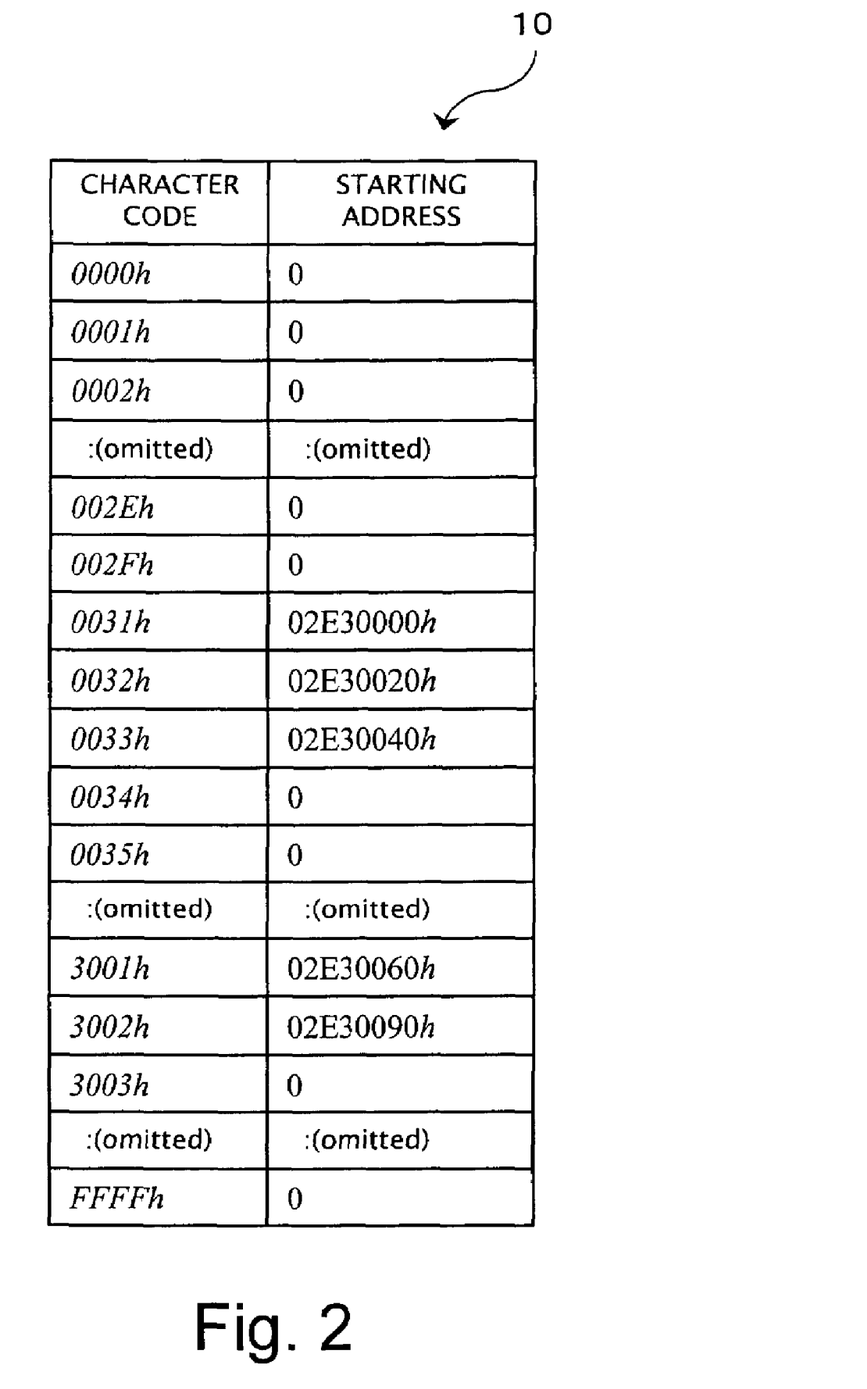
FIG. 2 is a conceptual illustration of a pointer table according to the first embodiment.

FIG. 2 shows a conceptual illustration of the pointer table 10 shown in FIG. 1. The pointer table 10 is formed from a plurality of records. Regardless of presence/absence of bitmap data, start addresses of bitmap data are stored in all records, which correspond to the start 0000h to the end FFFFh of 2-byte character records (e.g., unicodes). For instance, the start address of a character code 0031h is 02E30000h, and the start address of a character code 0033h is 02E30040h. When 0 is stored in the record, this numeral indicates that bitmap data corresponding to the character code does not exist. Although in the drawing the start address of bitmap data is shown in correspondence to a character code, each of the records of the pointer table 10 does not actually include a character code, and only a start address of the bitmap data is stored.

Figure 3:
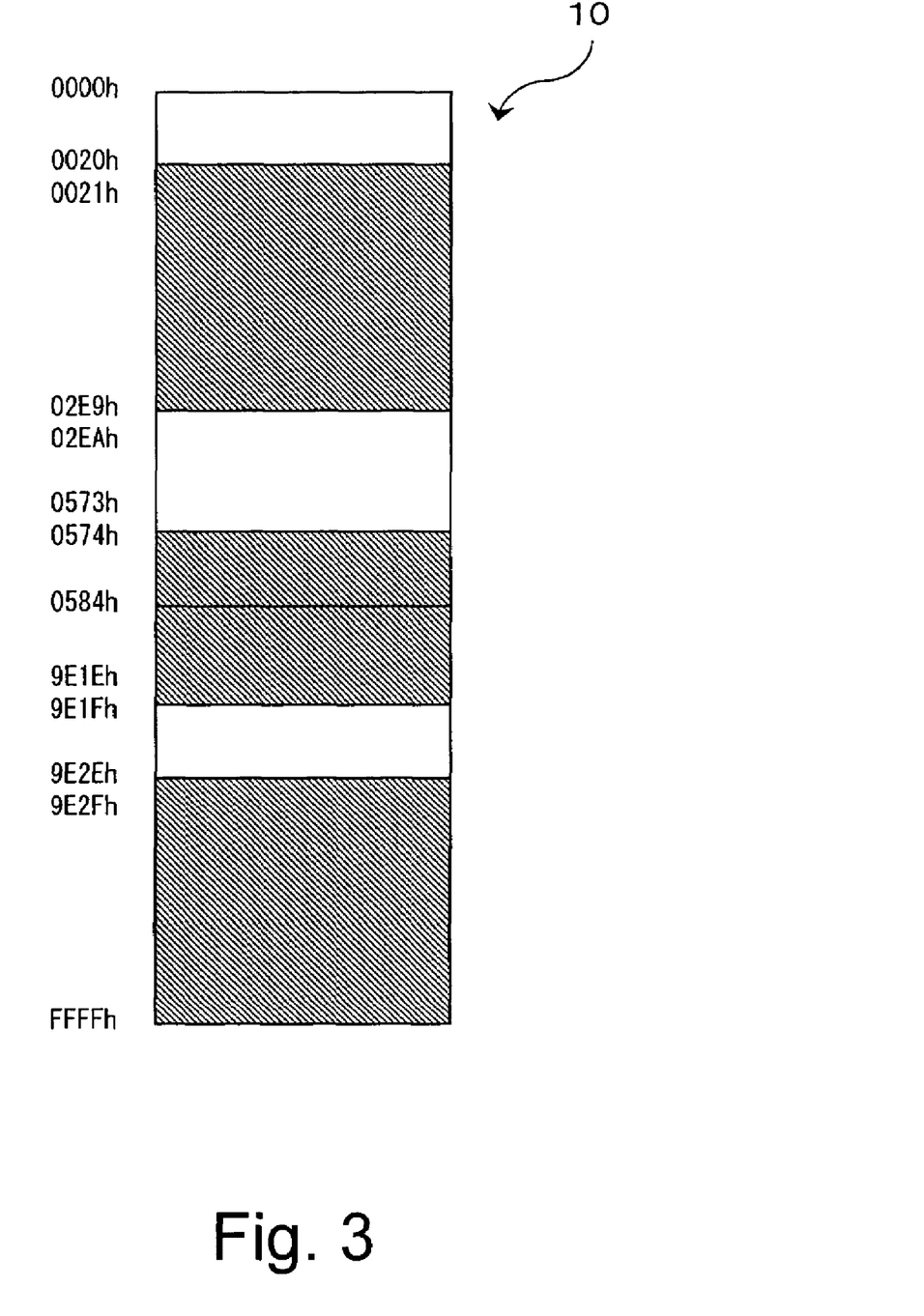
FIG. 3 is a descriptive view showing the configuration of the pointer table of the first embodiment.

FIG. 3 shows the actual configuration of the pointer table 10. Hatched character code areas are an area where start addresses are stored. Since each record has a fixed length of 4 bytes (although the length of each record is dependent on a platform, in the present embodiment the length of the record is 4 bytes), a value—which is determined by multiplying the input character code by the size of one record—is added to the start address of the pointer table 10, so that a target record can be directly retrieved without involvement of a sequential retrieval from the start address of the pointer table 10. Accordingly, a start address of the bitmap data stored in the target record can be acquired. Since sequential retrieval is not required, a search time can be greatly shortened even in the case of a plurality of languages and a wide range of character codes.

Figure 4:
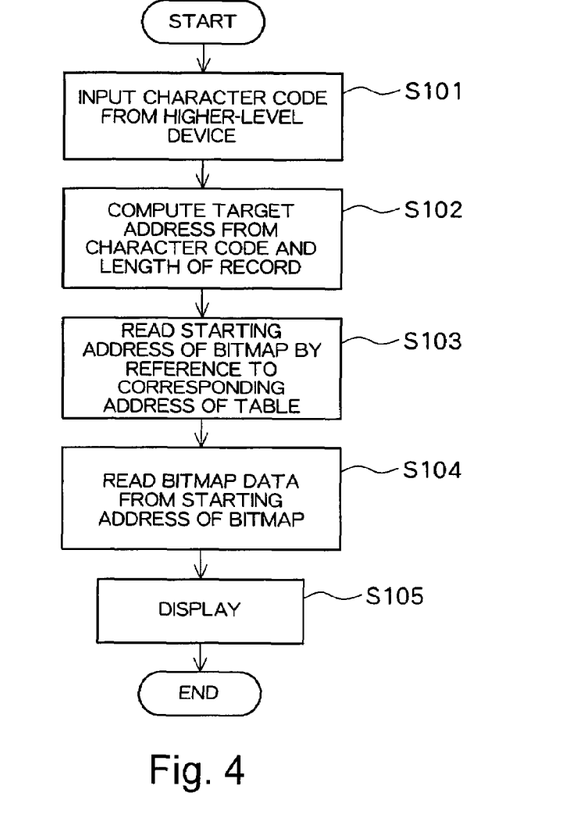
FIG. 4 is a font display processing flowchart of the first embodiment.

FIG. 4 is a font display processing flowchart of the present embodiment. First, when a character code to be displayed is input from a higher-level device or another external device (S101), the processor 2 computes a target address in the pointer table 10 from the character code and a record length (4 bytes) thereof (S102). Direct access is made to a record at the address of the pointer table 10, to thereby read a start address of the bitmap data stored in that record (S103). After acquisition of the start address, the processor 2 reads bitmap data from this start address (S104), and displays the thus-read bitmap data on the display device 3 (S105).

As mentioned above, in the present embodiment, a target record in the pointer table can be retrieved by means of a direct input of a character code, to thus acquire a start address of the bitmap data. Hence, a desired character can be quickly displayed even in the case of a plurality of languages.

Second Embodiment

The pointer table 10 of the first embodiment enables shortening of the search time. However, records are assigned to all the character codes of 0000h to FFFFh. For this reason, an area where a character corresponding to a character code is not defined and a character area which is not actually used (e.g., Arabic characters are not used by digital cameras destined for the Japanese market) (unhatched areas in FIG. 3) are included, which in turn leads to an increase in the capacity of ROM where the pointer table 10 is stored. In the present embodiment, in order to effectively utilize a system resource, the pointer table 10 is taken as an initial pointer table. Two tables; i.e., a first pointer table and a second pointer table, are prepared from this initial pointer table. The start address of bitmap data is retrieved by means of combined use of these two pointer tables in place of the initial pointer table.

Figure 5:
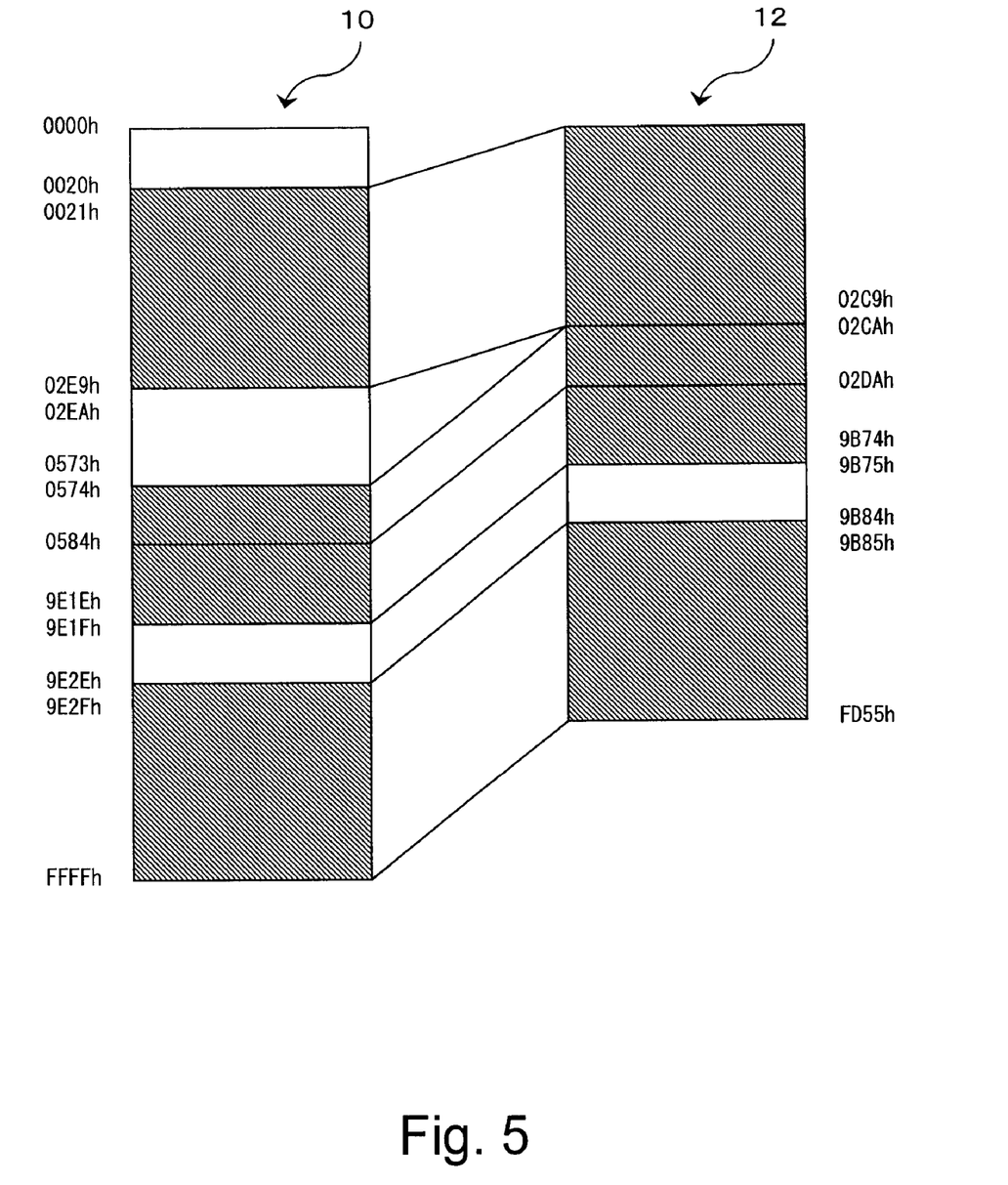
FIG. 5 is a descriptive view showing the configuration of a pointer table (a first pointer table) according to a second embodiment of the present invention.
Figure 6:
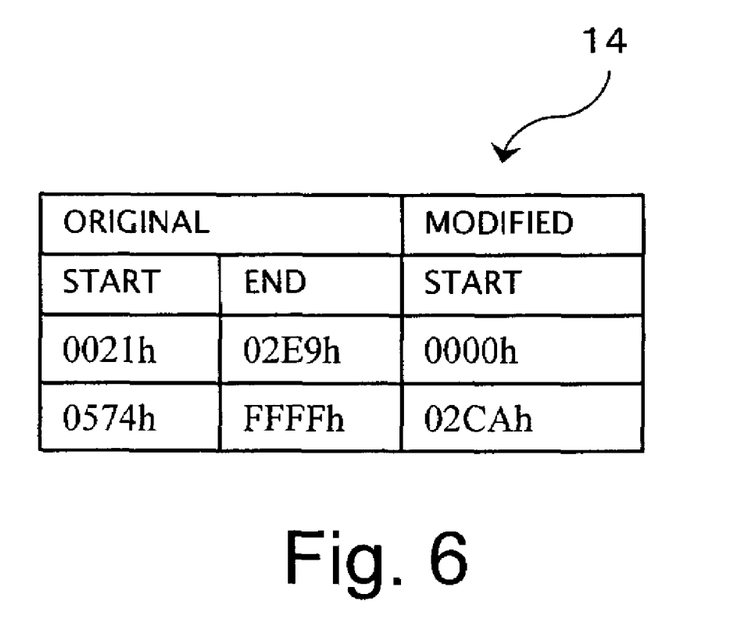
FIG. 6 is a descriptive view showing the configuration of another pointer table (a second pointer table) according to the second embodiment.

FIGS. 5 and 6 show a pointer table 12 (a first pointer table) and a pointer table 14 (a second pointer table) according to the present embodiment. FIG. 5 also shows the pointer table 10 of the first embodiment for comparison. In the pointer table 10 shown in FIG. 3, character code areas of 0000h to 0020h, character code areas of 02EAh to 0573h, and character code areas of 9E1Fh to 9E2Eh are useless areas which are not used in reality. In order to diminish the capacity of ROM where the pointer table is stored, at least some of these wasteful areas are removed, to thus prepare a new pointer table 12. In FIG. 5, character code areas 0000h to 0020h and character code areas 02EAh to 0573h are removed (or these areas are skipped), to thus obtain the new pointer table 12. The volume of the pointer table is reduced by the amount corresponding to the removed, wasteful areas or the skipped areas. Area 9E1Fh to 9E2Eh is neither removed nor skipped. The reason for this will be described later.

The pointer table 14 shown in FIG. 6 shows correspondence between addresses of areas which can be accessed by the pointer table 12. In FIG. 6, an "ORIGINAL" column shows a start point (START) and an end point (END) of each of undeleted character code areas in the pointer table 10. A "MODIFIED" column shows the start point of each of undeleted areas in the pointer table 12. Specifically, the first undeleted area in the original initial pointer table 10 corresponds to a character code range from 0021h to 02E9h. This character code range starts from 0000h in the pointer table 12. Similarly, the second undeleted area corresponds to a character code range from 0574h to FFFFh in the original initial pointer table 1O. This character code range starts from 02CAh in the pointer table 12. Each of the records of the pointer table 14 is six bytes. For instance, 002102E90000h is stored in the first record. First 0021h represents "START" in the "ORIGINAL" column. Subsequent 02E9h represents "END" in the "ORIGINAL" column. Final 0000h represents "START" in the "MODIFIED" column. The pointer table 14 specifies a relationship between the address positions of remaining areas in the initial pointer table 10 and corresponding address positions in the pointer table 12 after deletion of at least some of the unused character areas.

In such a table configuration, when a character code of a character to be displayed is given, the processor 2 first refers to the pointer table 14 shown in FIG. 6. For instance, the character code is assumed to be 0584h. This character code is greater than character code 0574h in the "START" of the "ORIGINAL" column in the second record of the pointer table 14 shown in FIG. 6 but smaller than character code FFFFh in the "END" of the "ORIGINAL" column. Accordingly, the character code is understood to belong to this character code area. The character code is understood to situate at the $17^{th}$ position in this area by means of subtracting 0574h in the "START" column of the corresponding record. The actual pointer table 12 is a table which is determined by means of deleting at least some of the unused areas from the pointer table 10. Hence, the actual position of the character code in this pointer table 12 is now determined. A corresponding area is understood to actually start from 02CAh in the pointer table 12 by reference to the "START" of the "MODIFIED" column. By means of adding an offset of $17^{th}$ to 02CAh, the start address of the target character code is finally, easily understood to be stored in a record specified by 02DAh of the pointer table 12. As above, the start address of the bitmap data can be acquired by combined use of the two pointer tables 12, 14.

Although the pointer table 10 shows three areas as areas where characters are not defined and unused areas, the areas are provided for convenience of description. These wasteful areas are numerously present in reality. When all of these areas are assumed to be deleted, the volume of data in the pointer table 14 shown in FIG. 6 is increased, which will in turn diminish the effect of a reduction in ROM capacity achieved by the pointer table 12 and increase search time as well. Consequently, a certain threshold value is preferably set rather than deleting all areas where characters are not defined or unused areas. When the size of an unused area is smaller than this threshold value, leaving the unused area in the pointer table 12 without modifications is preferable.

A method for setting a threshold value, which is to become a reference at the time of deletion of an unused area, will now be described.

Deleting unused character code areas from the pointer table 10 shown in FIG. 3 signifies addition of one record (six bytes) to the pointer table 14 shown in FIG. 6. Specifically, in order to reduce overall ROM capacity, the volume of data to be deleted must be six bytes or more. Since the record of the pointer table 10 is of four bytes, the minimum number of records that can be deleted is two (eight bytes).

The number of records to be deleted is inversely proportional to the speed of retrieval of bitmap data. In a word, the speed of retrieval of a font decreases every time one area is deleted. The following is the reason for this. As mentioned above, the processor 2 first performs retrieval from the pointer table 14 and subsequently performs retrieval from the pointer table 12. As the number of records deleted from the pointer table 10 increases, the number of records in the pointer table 14 increases, and the search time also increases in proportion to the number of records in the pointer table 14. Consequently, in the present embodiment, in order to achieve both an increase in search speed and effective utilization of system resources, the number of records to be deleted must be set to the minimum number at which maximum use of system resources can be attained.

Figure 7:
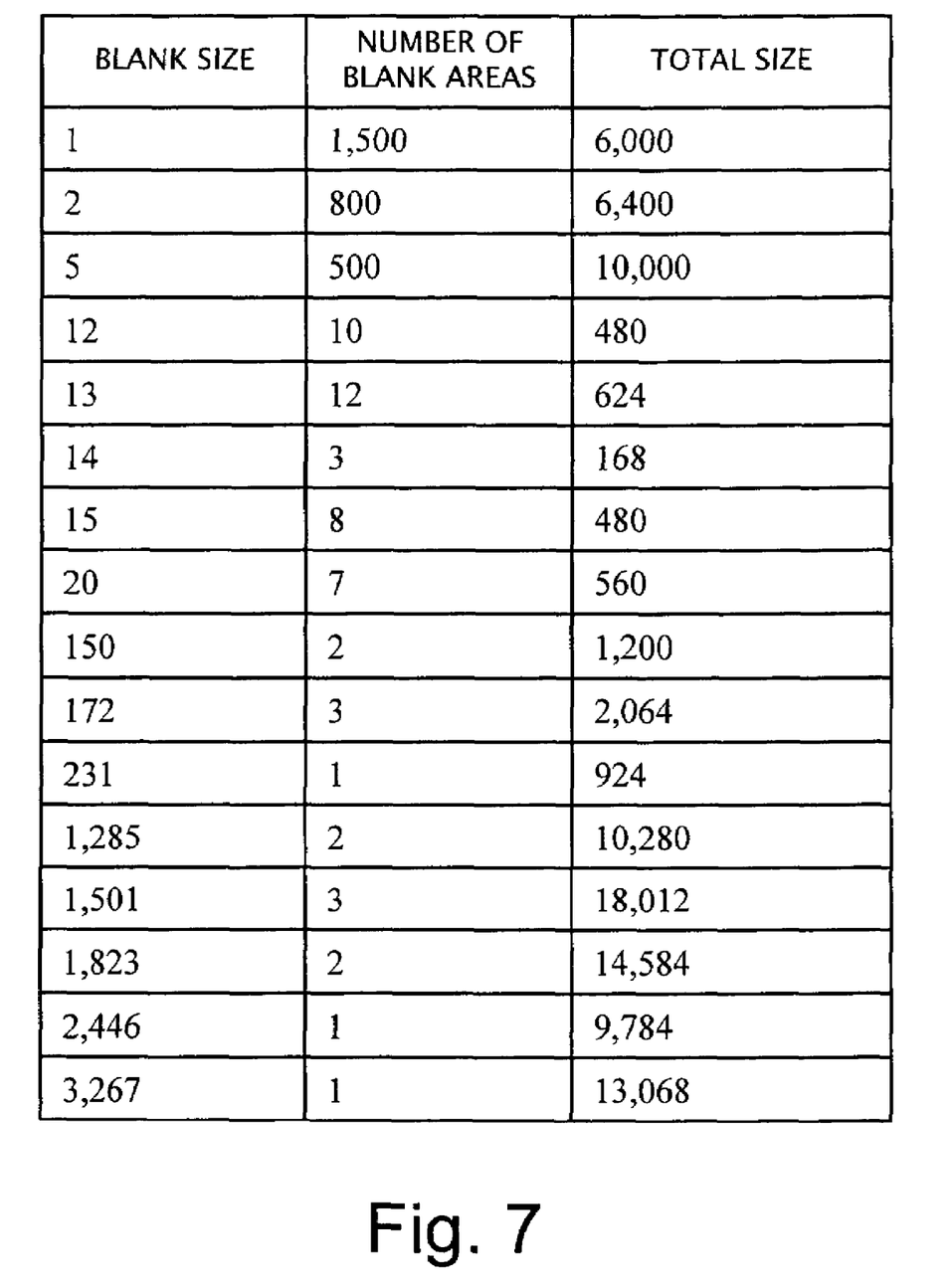
FIG. 7 is a descriptive view showing the pattern of presence of disused areas in the pointer table.

FIG. 7 shows an example of blank sizes and the number of blank areas of these blank sizes on condition that unused areas are taken as blank areas (unhatched areas in FIG. 3), as well as showing total sizes, each of which is determined by means of multiplying a blank size by the number of blank areas of that size and further multiplying the resultant value by the number of bytes (four bytes) in one record. In the present embodiment, blank areas of smaller blank sizes are assumed to be spread in larger numbers. The number of areas, each of which has a blank size of one (corresponding to one record), is assumed to be 1500. The number of areas, each of which has a blank size of 1501 (corresponding to 1501 records), is assumed to be three. The number of areas, each of which has a blank size of 3267 (corresponding to 3267 records), is assumed to be one. In order to minimize a drop in search speed, the blank area of greater size must be deleted with a higher priority.

Figure 8:
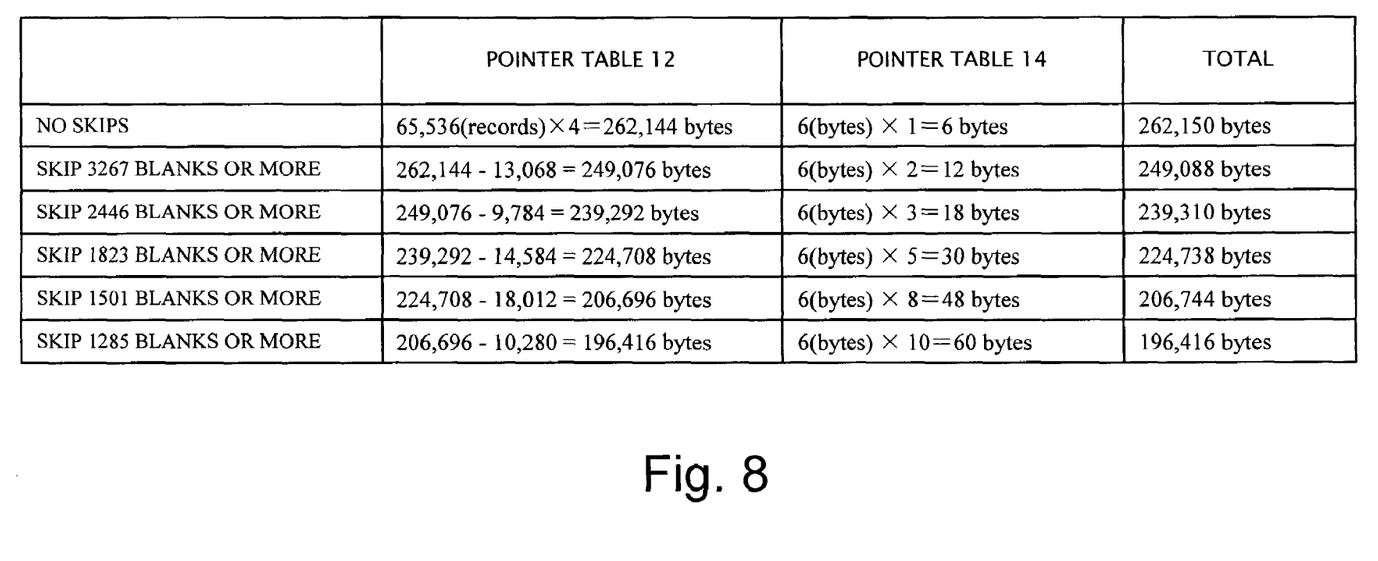
FIG. 8 is a descriptive view showing total quantities of the pointer tables achieved when blank areas to be skipped are changed.

FIG. 8 shows the total volumes of the pointer tables 12, 14 acquired when the number of records to be deleted is changed in various manners in connection with the blank pattern shown in FIG. 7. The size of available resources is assumed to be 200 KB.

When no skips are assumed to be made (no records are assumed to be deleted), one record of the pointer table 12 is four bytes. Hence, the volume of the pointer table 12 is assumed to be 65,536×4(bytes)=262,144(bytes). Since no skip is made, only one record is present in the pointer table. Hence, the volume of the pointer table 14 is 1×6(bytes)=6 (bytes). Accordingly, the total volume of the pointer table 12 and the pointer table 14 comes to 262,150(bytes), which exceeds the system resources; namely, 200 KB.

On the assumption that 3267 blank areas or more are skipped, the total size is 13,068 (bytes) as shown in FIG. 7. Therefore, the volume of the pointer table 12 assumes a value of 262,144(bytes)−13,068(bytes)=249,076(bytes). Since the number of blank areas is one, the number of records in the pointer table 14 becomes two, and the volume of the pointer table 14 assumes a value of 2×6(bytes)=12(bytes). Accordingly, the total volume of the pointer tables 12, 14 comes to 249,088(bytes). The total volume still exceeds 200 KB, which is the size of system resources. Consequently, blank areas of smaller sizes must be deleted, as well.

On the assumption that 1501 blank areas or more are skipped, the total size is 18,012(bytes) as shown in FIG. 7. Hence, the volume of the pointer table 12 assumes a value of 224,708(bytes) (the volume of the pointer table 12 achieved on condition that 1823 blanks or more are skipped)−18,012 (bytes)=206,696(bytes). Thus, the total volume still exceeds 200 KB, which is the size of system resources without calculating the volume of the pointer table 14. Consequently, a necessity for deleting blank areas of smaller sizes is understood.

In the meanwhile, on the assumption that 1285 blank areas or more are skipped, the total size is 10,280(bytes). Hence, the volume of the pointer table 12 assumes a value of 206,696 (bytes)−10,280(bytes)=196,416(bytes). Since the number of blank areas is a total of nine, the number of records in the pointer table 14 comes to 10, and the volume of the pointer table 14 assumes a value of 10×6(bytes)=60(bytes). Therefore, the total volume of the pointer table 12 and the pointer table 14 comes to 196,416(bytes). Thus, the total volume falls within a range of 200 KB, which is the size of the system resources.

As above, according to the pattern of presence of blank areas, such as that shown in FIG. 7, a maximum of 1285 blank areas can be deleted. When 231 blank areas are deleted, the total volume of the pointer tables can be reduced further. However, as mentioned above, the search time will increase, and hence the optimum threshold value is set to 1,285.

Figure 9:
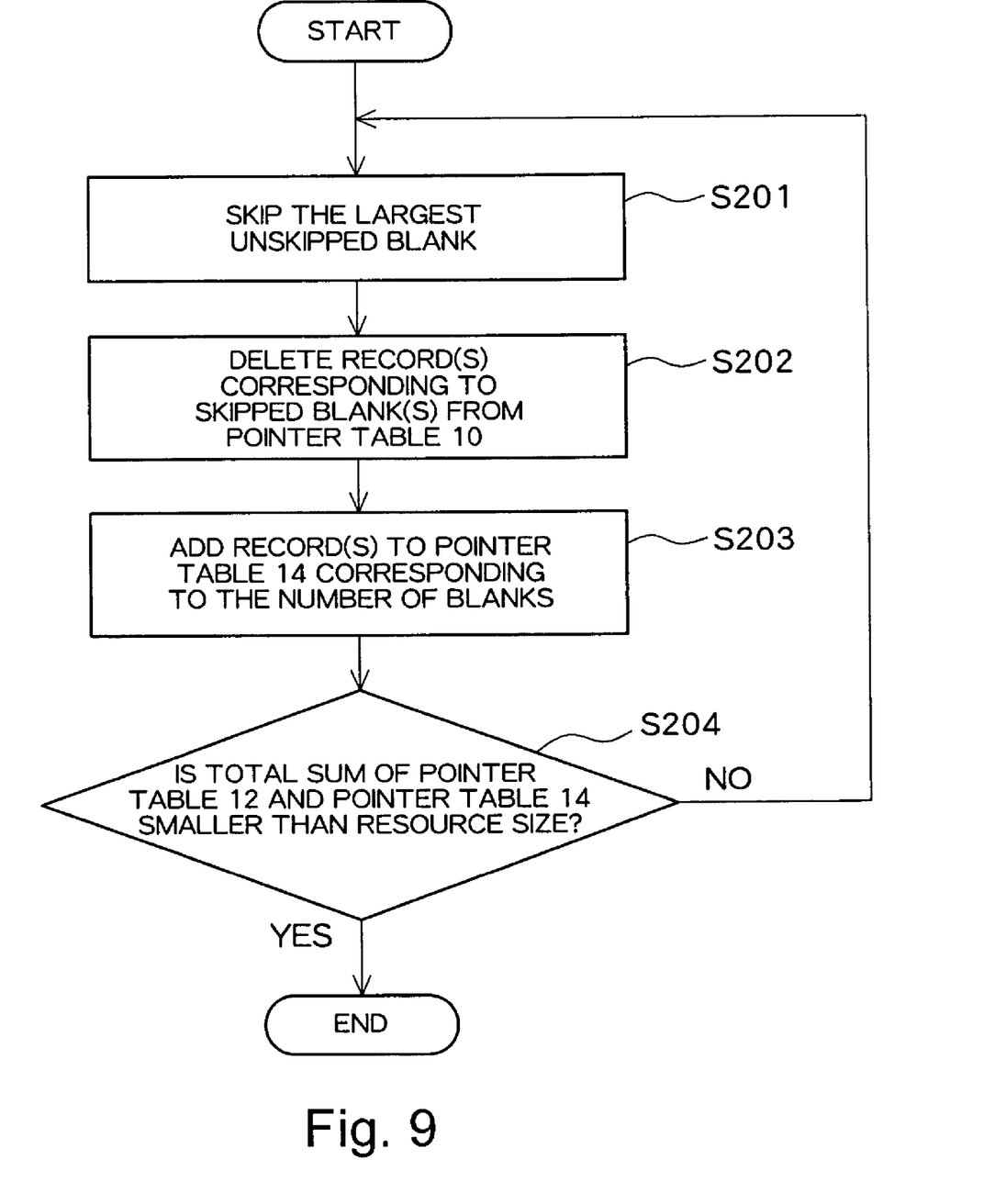
FIG. 9 is a flowchart pertaining to processing for preparing a first pointer table and a second pointer table according to the second embodiment.

FIG. 9 shows a flowchart pertaining to processing for preparing the pointer tables 12, 14 from the pointer table 10. First, the greatest blank area, which still remains undeleted, in the pointer table 10 is skipped (S201). Records corresponding to skipped blanks are deleted from the pointer table 10 (S202), to thus prepare the pointer table 12. Next, records corresponding to the number of blanks are added to the pointer table 14 (S203). After the pointer tables 12 and 14 have been tentatively prepared as above, a determination is made as to whether or not the total volume of the pointer tables 12 and 14 is smaller than the resource size (S204). When the total volume exceeds the resource size (NO in S204), processing again returns to S201. The largest blank that still remains unskipped is skipped. Processing mentioned above is iteratively executed until the total volume of the pointer tables 12, 14 becomes smaller than the volume of the resources. The pointer tables 12, 14 achieved at a point in time when the total volume has become smaller than the volume of the resource (YES in S204) are defined as final pointer tables.

The invention has been described in detail with particular reference to certain preferred embodiments thereof, but it will be understood that variations and modifications can be effected within the spirit and scope of the invention.

PARTS LIST

1 font management system
2 processor
3 display device
10 pointer table
11 bitmap data
12 pointer table
14 pointer table

The invention claimed is:

1. A font management system comprising:
    a pointer table for storing start addresses of bitmap data assigned to all character codes included in a given coded character set; and
    a processor which, upon receipt of an input of a character code to be displayed, acquires a start address of bitmap data assigned to the input character code by reference to the pointer table and displays a character on a display device, wherein
    the pointer table includes a first pointer table and a second pointer table;
    the first pointer table is formed by means of deleting at least some of character code areas, where bitmap data are not present, from an initial pointer table having records of fixed length where are stored start addresses of bitmap data assigned to all the character codes from start to end;
    the second pointer table stores a relationship between positions of undeleted, remaining character code areas in the first pointer table and positions of the same in the initial pointer table; and
    the processor accesses the second pointer table to thus acquire an address of the input character code in the first pointer table, and directly accesses the corresponding record in the first pointer table by use of the acquired address to thereby acquire the start address.

2. The font management system according to claim 1, wherein the first pointer table is deleted only when the size of a character code area in the initial pointer table where bitmap data is not present is equal to or greater than a threshold value.

3. The font management system according to claim 1, wherein, when a plurality of character code areas, where bitmap data are not present, exist in the initial pointer table, the first pointer table is set, as the number of areas to be deleted, to the minimum number at which the total volume of the first pointer table and the second pointer table becomes equal to or smaller than allowable memory capacity.

* * * * *